United States Patent [19]

Wears et al.

[11] Patent Number: 5,791,629
[45] Date of Patent: Aug. 11, 1998

[54] BUSHING-LESS STEM GUIDED CONTROL VALVE

[75] Inventors: William E. Wears; Charles W. Wood; Karl F. Putman, all of Marshalltown, Iowa

[73] Assignee: Fisher Controls International, Inc., Clayton, Mo.

[21] Appl. No.: 742,087

[22] Filed: Oct. 31, 1996

[51] Int. Cl.$^6$ .......................... F16K 41/04; F16J 15/20; F16J 15/24
[52] U.S. Cl. .......................... 251/214; 277/112; 277/124; 277/125
[58] Field of Search .......................... 251/214; 277/105, 277/106, 110, 112, 123, 124, 125

[56] References Cited

U.S. PATENT DOCUMENTS

| | | | |
|---|---|---|---|
| 2,765,185 | 10/1956 | Mott | 251/214 |
| 4,475,712 | 10/1984 | DeJager | 251/214 |
| 4,844,411 | 7/1989 | Nelson | 251/214 |
| 4,886,241 | 12/1989 | Davis et al. | 277/124 |
| 5,056,757 | 10/1991 | Wood | 251/214 |
| 5,056,758 | 10/1991 | Bramblet | 251/214 |
| 5,129,625 | 7/1992 | Wood et al. | 251/214 |
| 5,131,666 | 7/1992 | Hutchens | 251/214 |
| 5,190,264 | 3/1993 | Boger | 251/214 |
| 5,230,498 | 7/1993 | Wood et al. | 277/106 |
| 5,263,682 | 11/1993 | Covert et al. | 251/214 |
| 5,299,812 | 4/1994 | Brestel et al. | 277/125 |
| 5,326,074 | 7/1994 | Spock, Jr. et al. | 251/214 |

*Primary Examiner*—George L. Walton
*Attorney, Agent, or Firm*—Marshall, O'Toole, Gerstein, Murray & Borun

[57] ABSTRACT

A fluid control valve in which the usual metal stem guide bushings have been eliminated. A fluid control valve includes a valve bonnet and a packing nut threadably engaging the valve bonnet. A valve stem passes through the valve bonnet and the packing nut in a clearance fit so that there is no engagement therebetween. Two packing sets of V-type PTFE packing are included with each set having a middle virgin PTFE sealing ring, a carbon or glass filled PTFE male packing ring on one side and a carbon or glass filled PTFE female ring on the other side. Belleville disk springs are provided intermediate the packing nut and the two packing sets, for supplying live loading to the packing. In an unloaded condition, initially the packing sets both are in a clearance fit with the valve stem. Threadably inserting the packing nut into the valve bonnet until there are no visible threads at the top of the bonnet ensures a sufficient loading to seal the valve stem, seal the inside diameter of the bonnet, and to provide a sufficient stem guidance, interference fit with the valve stem to enable the usual upper and lower metal guide bushings to be eliminated.

3 Claims, 1 Drawing Sheet

BUSHING-LESS STEM GUIDED CONTROL VALVE

This invention relates to fluid control valves and in particular to apparatus for guiding a valve operating member such as a valve stem.

BACKGROUND OF THE INVENTION

Reference may be made to the following U.S. Patents of interest, all assigned to the same assignee as herein: U.S. Pat. Nos. 4,886,241; 5,056,757; 5,129,625; and 5,299,812.

The above-mentioned patents illustrate the desirability of utilizing packing material formed of polytetrafluoroethylene (PTFE), and particularly packing known in the trade as a "V-type PTFE packing". The above patents also illustrate that in typical construction for a stem guided control valve, two guide bushings are utilized spaced apart on the valve stem to stabilize the valve stem from side loads that occur during operation. These bushings typically are either metal or metal with a PTFE liner, with the packing rings located therebetween.

It is always desired to provide a new device with less components than the presently available devices, as long as the new device operates as well and provides the same advantages as the prior devices. Accordingly, it is desired to provide a fluid control valve which eliminates the usual guide bushings provided in the past for guiding of the valve stem.

SUMMARY OF THE INVENTION

In accordance with the principles of the present invention, there is provided a fluid control valve without guide bushings and wherein the packing assembly is subjected to a packing load sufficient to not only provide the desired seal around the valve stem and within the outer diameter of the valve bonnet bore, but also provides a stem guidance interference fit sufficient to guide the valve stem and to stabilize the valve stem from side loads.

A fluid control valve is provided having a valve bonnet with a central bore for containing the packing and wherein an elongated packing nut is threadably engaged within the upper end of the valve bonnet. A valve stem extends through the packing nut and the valve bonnet. An upper clearance fit is provided between the packing nut and the valve stem. A lower clearance fit is provided between the valve bonnet and the valve stem. In each case, the clearance is such that there is no engagement between the valve stem and either the packing nut or the valve bonnet.

Two packing sets are provided surrounding the valve stem and located within the valve bonnet central bore. It is preferred that V-type PTFE packing rings are utilized in which in each packing set there is a middle PTFE sealing ring sandwiched between a filled PTFE male ring (i.e. carbon or glass filled PTFE) and a filled PTFE female packing ring formed of carbon or glass filled PTFE. At each end of each set of packing there is provided an anti-extrusion wiper ring formed of filled PTFE or composition gasket material a set of disk springs such as Belleville disk springs is mounted between the packing nut and the first of the two packing ring sets with the anti-extrusion rings on each end. Tightening of the packing nut compresses the Belleville disk springs, thus loading the packing material and compressing the packing rings to create a seal around the valve stem and also on the inside diameter of the bonnet. The compression of the packing set eliminates the need for the upper and lower guide bushings typically used in the past in such valve stem guided control valves. The Belleville disk springs will maintain the loading and compression of the packing set over an extended period of time.

In accordance with another aspect of the present invention, a visual indication of the proper packing load is obtained by tightening the packing nut until the packing nut threads become flush with the threads at the top of the bonnet.

The preferred embodiment as described above includes live loading of the packing set supplied by the Belleville disk washers. In an alternative embodiment, the Belleville disk springs can be eliminated with the loading to be supplied by tightening of the packing nut against the packing set. However, this is not as desirable as the preferred embodiment in that because the live loading of the Belleville disk springs has been eliminated, the packing nut would need to be retightened from time to time.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
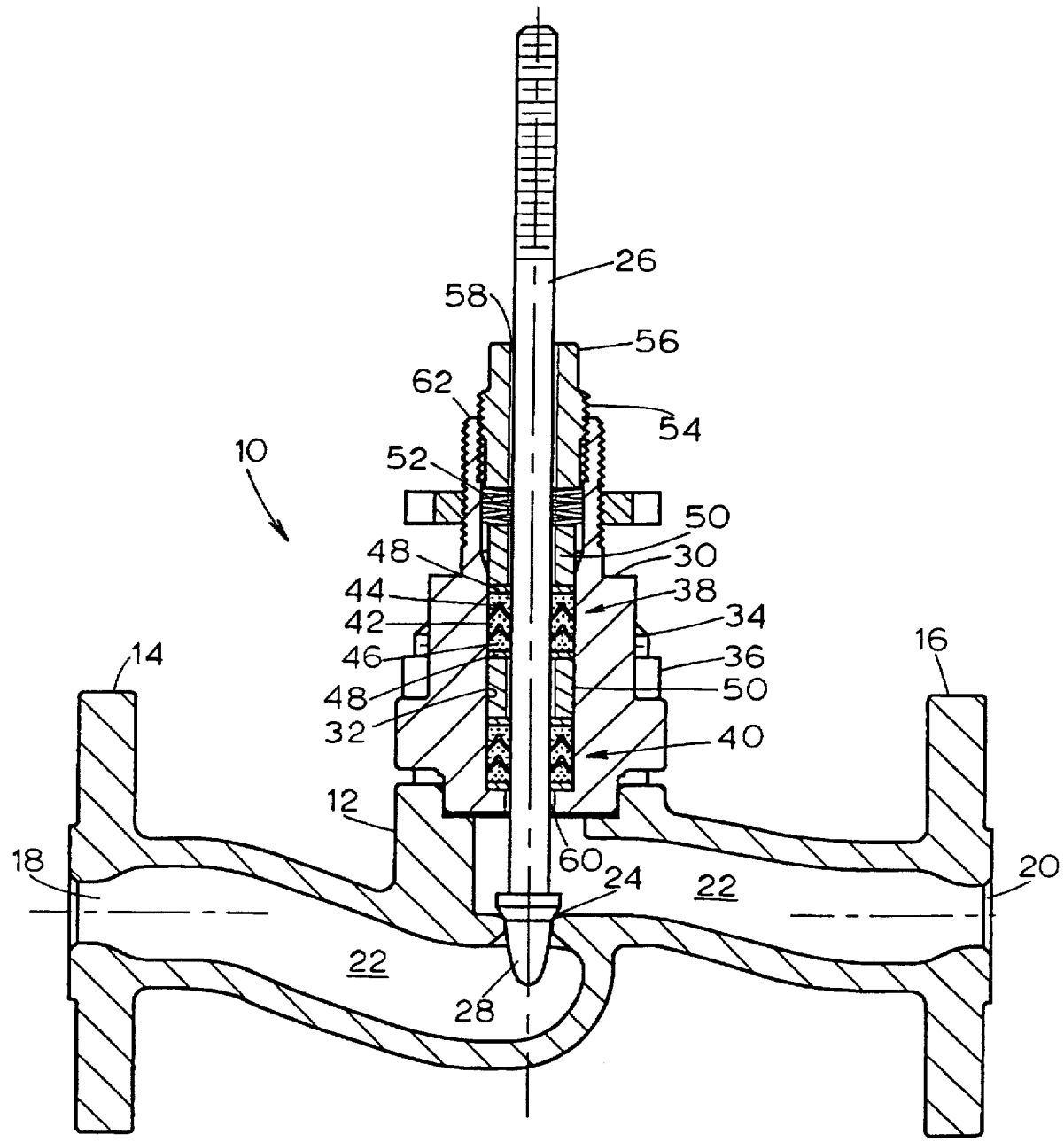
FIG. 1 is a sectional elevational view illustrating a fluid control valve without the usual metal guide bushings.

FIG. 1 shows a fluid control valve 10 having a valve body 12 with opposite mounting flanges 14, 16 for mounting the valve 10, for instance, in a pipeline system. The valve body 12 also includes a fluid inlet 18 and a fluid outlet 20 with a passageway 22 communicating therebetween.

A valve seat 24 is provided in the passageway for controlling the fluid flow through the valve in response to the position of a valve operating member such as a valve stem 26 having a valve plug 28 at one end for sealing engagement with the valve seat 24.

A valve bonnet 30 has a central bore 32 and is securely mounted to the valve body 12 by a series of threaded studs 34 and mounting nuts 36.

Within the central bore 32 there is provided two packing assemblies, an upper assembly 38 and a lower assembly 40. Each of the packing set assemblies 38, 40 includes the same components, namely, a V-type packing set with a middle PTFE sealing ring 42 sandwiched between a filled PTFE female ring 44 and a filled PTFE male ring 46, and with an anti-extrusion ring 48 on each end of the packing set. It is preferred that the filled PTFE male and female rings be formed of carbon or glass filled PTFE, whereas the middle sealing ring 42 is formed of virgin PTFE. It is understood that the packing set assembly 40 includes the same components as described above which are in the packing set assembly 38. For proper spacing of the components, there is provided a pair of spacer rings 50, each formed of metal, such as stainless steel.

Above the upper spacer ring 50, there is provided a set of disk springs 52, such as Belleville disk springs. As shown in FIG. 1, the upper end of the valve bonnet 30 has inside threads for threadably engaging the threads 54 on a threaded packing nut 56.

Further, as shown in FIG. 1, there is illustrated an upper clearance bore 58 within the packing nut 56 so that the inside diameter of the bore 58 is larger than the outside diameter of the valve stem 26. This ensures that as the valve stem operates within the valve, there is no engagement of the valve stem 26 with the packing nut 56.

Also, there is provided a lower clearance bore 60 between the valve stem 26 and the valve bonnet 30 such that the inside diameter of the bore 60 is larger than the outer diameter of the valve stem 26 to prevent engagement of the valve stem with the valve bonnet.

Similarly, there is provided a sufficient clearance between the valve stem 26 and the inside diameter of the spacer rings 50 so that there is no engagement of the valve stem with the spacer rings. Accordingly, neither the packing nut 56 nor the valve bonnet 30, nor the spacer rings 50 provide any guidance of the valve stem 26. While the Belleville disk springs 52 are provided with a close tolerance on their outside diameter with the central packing bore 32 within the valve body 30, the inside diameter of the Belleville springs is sufficiently larger than the valve stem outside diameter to prevent any engagement therebetween. The anti-extrusion rings 48 have little or no clearance on their outside diameter adjacent to the valve bonnet and also on the inside diameter next to the valve stem. The carbon or glass filled male and female packing rings 46, 44 are provided to back the virgin PTFE sealing ring 42 and thereby keep it in place.

In setting up of the valve components, FIG. 1 shows an unloaded view which can readily be ascertained by the operator in viewing the packing threads 54 visible above the top 62 of the valve bonnet 30. In this unloaded condition, all of the packing rings 42, 44, 46 in each of the packing set assemblies, 38, 40 are in a clearance fit, i.e. not engagement, with the valve stem 26. As the packing nut 56 is threadably engaged into the valve bonnet 30, a live loading compression is provided of the disk springs 52 which thereby places a live loading on the packing ring set. The operator continues to thread the packing nut 56 into the bonnet 30 until there are no visible threads 54 above the bonnet top 62. In this packing loaded condition, not only are the packing rings compressed sufficiently to create a seal around the stem 26 and also on the inside diameter of the packing bore 38 in the bonnet, but there is sufficient guidance of the valve stem 26 provided by the loaded packing set assemblies 38, 40 such that there is no need for the usual upper and lower metal guide bushings used in prior valves. With the proper loading on the packing set assemblies 38, 40, there is provided a stem guide interference fit of the packing rings 42, 44, 46 in each packing set with the valve stem 26. The function of the anti-extrusion rings is to prevent loss of material of the male and female packing rings due to the movement of the valve stem and extend their life.

The anti-extrusion rings 48 may be eliminated from the packing set assembly, however, this may reduce the reliable operating life of the packing set.

The foregoing detailed description has been given for clearness of understanding only, and no unnecessary limitations should be understood therefrom, as modifications will be obvious to those skilled in the art.

What is claimed is:

1. A fluid control valve comprising:

a valve body having a fluid inlet, a fluid outlet, a passageway communicating therebetween, and a valve seat in said passageway for controlling the fluid flow;

a valve bonnet mounted to the valve body and having a central bore;

an elongated valve operating member extending through said valve bonnet central bore with a plug end for sealingly engaging said valve seat, including a lower clearance bore between said valve bonnet and said elongated valve operating member so there is no engagement therebetween;

an elongated packing nut threadably engaging the valve bonnet, including an upper clearance bore along the entire length thereof at all times between the packing nut and the valve operating member so there is no engagement therebetween;

at least two packing sets in said valve bonnet central bore surrounding said valve operating member, each of said packing sets formed of V-type PTFE packing rings including a PTFE sealing ring between opposite male and female filled PTFE packing rings;

disc springs surrounding said valve operating member with a clearance along the entire length thereof at all times so there is no engagement therebetween, said disc springs mounted intermediate said packing nut and said first spacer ring and responding to said threadable engagement of said packing nut for compressing said disc springs and applying a variable packing load on said two packing sets, wherein initially with said disc springs uncompressed there is a clearance fit between said two packing sets and said valve operating member, and upon further threadably engaging the packing nut on said valve bonnet, the disc springs are compressed to apply said variable packing load on said two packing sets;

a first spacer ring between said disc springs and one of said packing sets and a second spacer ring between said two packing sets, including a clearance between the valve operating member and each spacer ring along the entire length thereof at all times so there is no engagement therebetween; and said two packing sets including stabilizing and sealing means (1) for solely stabilizing and guiding the valve operating member within the valve bonnet central bore and the packing nut upper clearance bore by said two variably loaded packing sets providing a guidance fit engagement between the two loaded packing sets and the valve operating member, said guidance fit engagement between the two variably loaded packing sets and the valve operating member is solely sufficient to guide and stabilize the valve operating member from side loads applied to the valve operating member, and (2) for solely sealing the valve operating member and the valve bonnet central bore outer diameter by said two variably loaded packing sets providing a sealing fit engagement, said sealing engagement fit between the two variably loaded packing sets and the valve operating member being sufficient to provide said seals.

2. A fluid control valve according to claim 1, wherein said male and female filled PTFE packing rings are formed of one of carbon filled and glass filled.

3. A fluid control valve according to claim 2, including anti-extrusion rings on each opposite end of said two packing sets and surrounding said valve operating member with an interference fit with said valve operating member and with the valve bonnet central bore outer diameter.

* * * * *

UNITED STATES PATENT AND TRADEMARK OFFICE
CERTIFICATE OF CORRECTION

PATENT NO. : 5,791,629

DATED : August 11, 1998

INVENTOR(S) : William E. Wears, et al.

It is certified that error appears in the above-identified patent and that said Letters Patent is hereby corrected as shown below:

On the title page, item:

[56] References Cited

U.S. Patent Documents

| | | | |
|---|---|---|---|
| 4,647,050 | 3/1987 | Johnson | 277/110 |
| 4,809,993 | 3/1989 | Henshaw | 277/110 |
| 5,593,166 | 1/1997 | Lovell et al. | 277/124 |

Signed and Sealed this

Sixteenth Day of May, 2000

Attest:

Q. TODD DICKINSON

Attesting Officer      Director of Patents and Trademarks